United States Patent
Tilghman et al.

(10) Patent No.: US 10,822,943 B2
(45) Date of Patent: Nov. 3, 2020

(54) MODULATING DOWNHOLE REFLECTOR

(71) Applicant: Halliburton Energy Services, Inc., Houston, TX (US)

(72) Inventors: Stephen E. Tilghman, Marlow, OK (US); Oladeji B. Akanbi, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 538 days.

(21) Appl. No.: 15/558,579

(22) PCT Filed: Apr. 13, 2015

(86) PCT No.: PCT/US2015/025532
§ 371 (c)(1),
(2) Date: Sep. 15, 2017

(87) PCT Pub. No.: WO2016/167738
PCT Pub. Date: Oct. 20, 2016

(65) Prior Publication Data
US 2018/0051556 A1    Feb. 22, 2018

(51) Int. Cl.
*H04B 10/00* (2013.01)
*E21B 47/135* (2012.01)
(Continued)

(52) U.S. Cl.
CPC ............ *E21B 47/135* (2020.05); *E21B 47/26* (2020.05); *G01V 8/24* (2013.01); *G01V 11/002* (2013.01); *G02F 1/0115* (2013.01); *H04B 10/40* (2013.01)

(58) Field of Classification Search
CPC ............... H04B 10/40; H04B 10/0775; H04B 10/5161; H04B 10/0795; H04B 10/516;
(Continued)

(56) References Cited

U.S. PATENT DOCUMENTS 5,675,674 A    10/1997  Weis et al.
6,587,037 B1   7/2003   Besser et al.
(Continued)

FOREIGN PATENT DOCUMENTS

EP    328156     8/1989
EP    1770714    9/2008
(Continued)

OTHER PUBLICATIONS

French Application No. 1652037, Preliminary Search Report dated May 17, 2018, 13 pages.
(Continued)

*Primary Examiner* — Hanh Phan
(74) *Attorney, Agent, or Firm* — Kilpatrick Townsend & Stockton LLP (57) ABSTRACT

A system and methods for providing optical, downhole data communication without requiring a light source in the downhole tool is disclosed. A carrier signal generated at the surface is sent to the downhole tool using an optical fiber. An optical modulator of the downhole tool uses data signals from a sensor to modulate the carrier signal based on the data signals. The modulated signal is transmitted to one or more optical receivers. The optical modulator can be coupled to the one or more optical receivers through the same optical fiber as the carrier signal generator, or one or more additional optical fibers.

20 Claims, 6 Drawing Sheets

(51) Int. Cl.
*G02F 1/01* (2006.01)
*G01V 11/00* (2006.01)
*G01V 8/24* (2006.01)
*E21B 47/26* (2012.01)
*H04B 10/40* (2013.01)

(58) Field of Classification Search
CPC .. H04B 10/505; H04B 10/532; H04B 10/541; H04B 10/548; H04B 10/0797; E21B 47/123; E21B 47/124; E21B 47/065; E21B 47/04
USPC ....... 398/140, 141, 158, 159, 169, 170, 183, 398/188, 135, 33, 25; 166/298, 387, 134, 166/66, 254.2; 340/854.3, 854.1, 854.7
See application file for complete search history.

(56) References Cited

U.S. PATENT DOCUMENTS

| | | | |
|---|---|---|---|
| 6,959,604 B2 | 11/2005 | Bryant et al. | |
| 7,684,664 B2 | 3/2010 | Digonnet et al. | |
| 7,900,699 B2 * | 3/2011 | Ramos | E21B 47/09 166/250.01 |
| 2005/0034857 A1 * | 2/2005 | Defretin | E21B 47/10 166/250.01 |
| 2008/0087078 A1 * | 4/2008 | Vannuffelen | E21B 47/102 73/152.54 |
| 2010/0039287 A1 | 2/2010 | Li et al. | |
| 2011/0109912 A1 | 5/2011 | Spross et al. | |
| 2011/0194806 A1 | 8/2011 | Hartog et al. | |
| 2012/0067118 A1 | 3/2012 | Hartog et al. | |
| 2016/0208603 A1 * | 7/2016 | Barfoot | E21B 47/123 |

FOREIGN PATENT DOCUMENTS

| | | |
|---|---|---|
| GB | 2368391 | 5/2002 |
| GB | 2433115 | 6/2007 |
| WO | 9850673 | 11/1998 |
| WO | 9850680 | 11/1998 |
| WO | 0163804 | 8/2001 |
| WO | 2004003342 | 1/2004 |

OTHER PUBLICATIONS

Yousefi et al., OTC 23947 Photonic Sensing for the Energy Business: An Integrated Approach, Available online At: https://www.onepetro.org/download/conference-paper/OTC-23947-MS?id=conference-paper/OTC-23947-MS, May 6, 2013, 1 page.

International Patent Application No. PCT/US2015/025532 , "International Search Report and Written Opinion", dated Nov. 24, 2015, 5 pages.

* cited by examiner

MODULATING DOWNHOLE REFLECTOR

TECHNICAL FIELD

The present disclosure relates to oilfield operations generally and more specifically to optical data transmission in oilfield operations.

BACKGROUND

In certain oilfield operations, optical fibers can be used to transfer data between the surface and downhole tools, specifically including sending data from the bottom of the well to the surface. The downhole tool can collect information from the well, which can be transmitted to the surface for further processing or consideration. The downhole tool can also collect information from itself or otherwise provide useful information at its disposal to the surface. The optical cables can be run downhole in, on, around, or concurrently with any tubulars, wirelines, or other objects placed downhole. In certain embodiments, power cannot be provided to a downhole tool from the surface (e.g., through a wireline) and instead the tool must be battery-powered.

Data can be collected and processed by electronic components in the downhole tool. The electronic signals can be converted to optical signals for transmission along the optical fibers. Light sources, such as light emitting diodes (LEDs) can be used in a downhole tool to provide optical signals to an optical fiber attached to the downhole tool in response to electrical data signals. LEDs may be used because of their relatively low power consumption. Downhole environments can subject a downhole tool to very high temperatures (e.g., over 100° C.), very high pressures (e.g., over 5,000 psi), and other challenging conditions. When subjected to downhole environments, LEDs may operate less efficiently, such as operating with reduced output when subjected to higher temperatures. Light sources, such as LEDs, may be operated at lower power in order to improve survivability of the component when subjected to downhole environments.

BRIEF DESCRIPTION OF THE DRAWINGS

The specification makes reference to the following appended figures, in which use of like reference numerals in different figures is intended to illustrate like or analogous components

DETAILED DESCRIPTION

Certain aspects and features of the present disclosure relate to providing optical data transmission from a downhole tool to the surface without requiring a light source in the downhole tool. A carrier signal can be generated at the surface and sent to the downhole tool using an optical fiber. In the downhole tool, an optical modulator can receive data signals from a sensor and can receive the carrier signal. The optical modulator can modulate the carrier signal based on the data signals in order to generate a modulated signal that is transmitted to one or more optical receivers. The optical modulator can be coupled to the one or more optical receivers through the same optical fiber as the carrier signal generator, or one or more additional optical fibers. The present disclosure enables data sensed by the downhole tool to be transmitted to the surface without the need to power a light source in the downhole tool.

A carrier signal generator at the surface can include a light source, such as an infrared laser. Other light sources, such as light-emitting diodes (LEDs) and lasers of other wavelengths can be used. The light source in the carrier signal generator is positioned at the surface, and therefore does not need to contend with the harsh downhole environment and does not need to fit within the power budget of the downhole tool. Since light sources, especially LEDs and solid state lasers, can provide reduced output and can physically degrade in the presence of high temperatures and harsh environments, the light source in the carrier signal generator can operate at full power. Furthermore, the light source in the carrier signal generator can be selected from a larger number of available light sources, including those light sources that do not meet the thermal, power, and environmental limits of a light source for use in a downhole environment.

The carrier signal can be a constant value carrier signal. The carrier signal can have a known amplitude. The carrier signal can be of any suitable frequency, such as infrared light (e.g., near-infrared between approximately 214 and 400 terahertz). Other frequencies of light can be used, including visible and nonvisible light.

The carrier signal can be transmitted to the downhole tool using a suitable waveguide, such as an optical fiber. One or more strands of optical fiber can be used to convey the carrier signal. In some embodiments, a splitter can split a carrier signal into being transmitted down multiple strands of optical fiber. At the opposite end of the optical fiber, the carrier signal is received by a modulator.

The modulator can be any suitable device for modulating the carrier signal based on a data signal. The modulator can be located at the downhole tool, such as in, on, or otherwise associated with the downhole tool. The modulator can receive a data signal from a sensor, such as from the sensor directly or through a processor. The modulator receives the carrier signal, modulates the carrier signal to create a modulated signal, and transmits the modulated signal to one or more receivers. The modulator modulates the carrier signal based on the data signal.

The data signal can originate from any suitable data acquisition system in the downhole tool. The data acquisition can include discrete components, processors, sensors, or any combination thereof. The data signal can be an electronic signal, magnetic signal, an optical signal, a mechanical signal, or any other suitable signal. In some embodiments, the sensor is a mechanical sensor that directly transmits a mechanical data signal to the modulator.

The modulator can be any device suitable for using a data signal to modulate the carrier signal. Modulators can include a modulating material designed to reflect optical light or pass optical light therethrough. The modulating material can distort the optical light as it is reflected or passed therethrough. The modulator can direct the optical light back through the same optical fiber from which the carrier signal came or through one or more other optical fibers. The modulating material can be made of a piezoelectric material, such as Lithium Niobate. An electric or electronic data signal can cause the piezoelectric material to mechanically distort, thus modulating the optical light that is reflected or passed through the modulating material. In some embodiments, the modulator can include a Mach-Zehnder device to induce a phase modulation in the carrier signal. Other modulators can be used that are capable of inducing a demodulatable change in one or more attributes of the carrier signal. Examples of demodulatable changes can include phase modulation, amplitude modulation, polarization modulation, frequency modulation, or any combination thereof.

The receiver can be any suitable device for receiving the modulated signal and demodulating the signal to recreate the data signal. The receiver can include an optical to electrical converter that converts the optical energy of the modulated signal into an electrical signal. A processor in the receiver demodulates the electrical signal into the data signal (e.g., the signal as sent from the sensor in the downhole tool). The processor can demodulate the electrical signal into the data signal due to knowledge of the carrier signal and its attributes (e.g., amplitude and frequency).

The use of a modulator in the downhole tool can reduce the amount of power needed at the downhole tool in order to transmit a data signal to the surface, as the power requirements of the modulator can be less than the power requirements of a light source. In some cases, a downhole tool must either obtain power through a power line connected to a power supply on the surface. In other cases, the downhole tool must provide its own local power (e.g., battery power). In either case, all of the elements of the downhole tool must fit within the power budget allocated to the downhole tool. In some instances, a downhole tool may be entirely unpowered and the sensor and modulator may be non-electric, allowing a mechanical, magnetic, or other non-electric sensor to induce the modulator (e.g., mechanically, magnetically, or otherwise) to modulate the carrier signal without the use of electrical power.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

Figure 1:
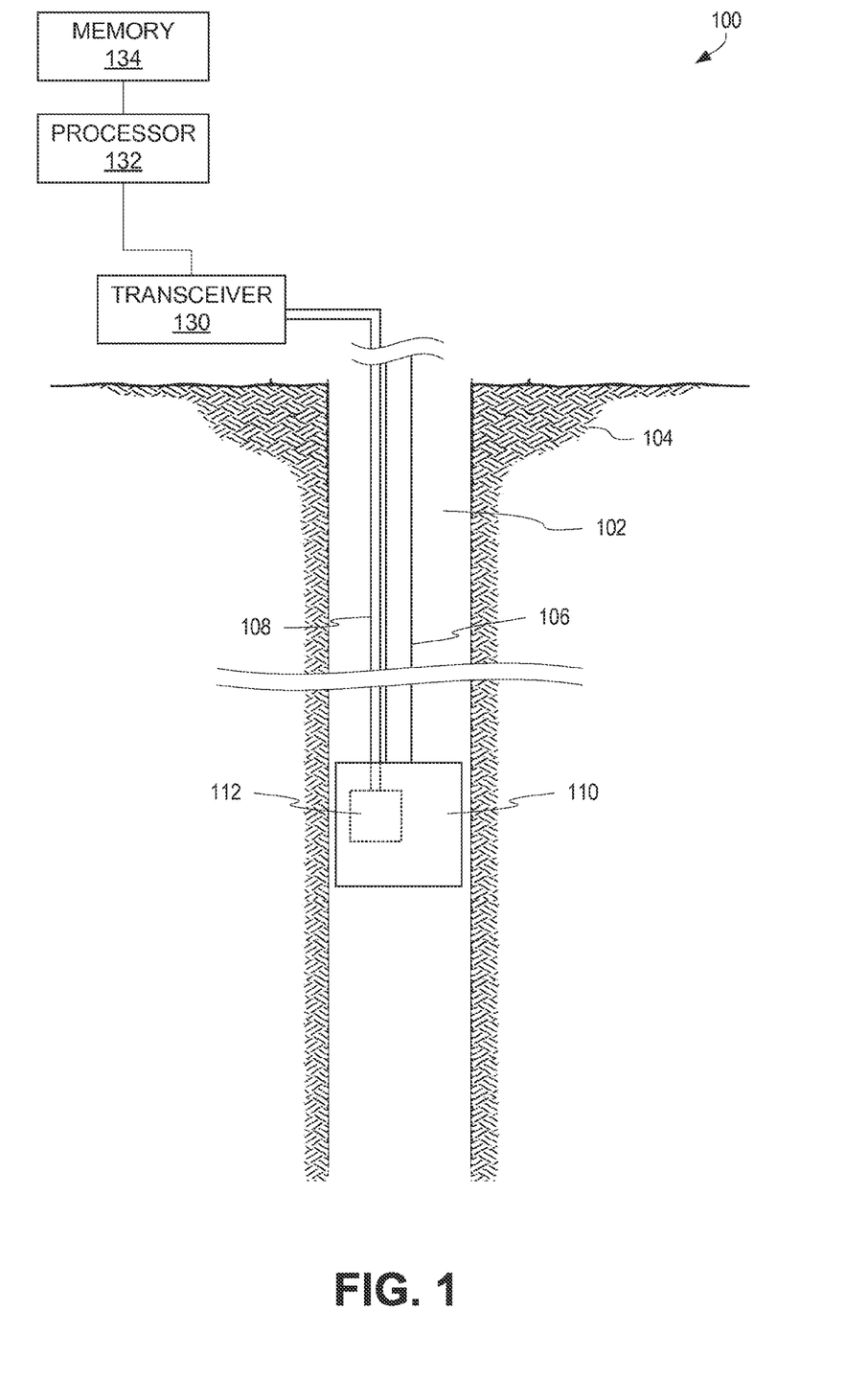
FIG. 1 is a schematic diagram of a wellbore servicing system that includes an optical modulator positioned on a wireline tool, according to certain aspects of the present disclosure.

FIG. 1 is a schematic diagram of a wellbore servicing system 100 that includes an optical modulator 112 positioned on a wireline tool 110, according to certain aspects of the present disclosure. The wellbore servicing system 100 also includes a wellbore 102 penetrating a subterranean formation 104 for the purpose of recovering hydrocarbons, storing hydrocarbons, disposing of carbon dioxide, or the like. The wellbore 102 can be drilled into the subterranean formation 104 using any suitable drilling technique. While shown as extending vertically from the surface in FIG. 1, in other examples the wellbore 102 can be deviated, horizontal, or curved over at least some portions of the wellbore 102. The wellbore 102 can be cased, open hole, contain tubing, and can include a hole in the ground having a variety of shapes or geometries.

A service rig, such as a drilling rig, a completion rig, a workover rig, or other mast structure or combination thereof can support a support line 106 in the wellbore 102, but in other examples a different structure can support the support line 106. In some aspects, a service rig can include a derrick with a rig floor through which the support line 106 extends downward from the service rig into the wellbore 102. The servicing rig can be supported by piers extending downwards to a seabed in some implementations. Alternatively, the service rig can be supported by columns sitting on hulls or pontoons (or both) that are ballasted below the water surface, which may be referred to as a semi-submersible platform or rig. In an off-shore location, a casing may extend from the service rig to exclude sea water and contain drilling fluid returns. Other mechanical mechanisms that are not shown may control the run-in and withdrawal of the support line 106 in the wellbore 102. Examples of these other mechanical mechanisms include a draw works coupled to a hoisting apparatus, a slickline unit or a wireline unit including a winching apparatus, another servicing vehicle, or other such mechanisms.

The support line 106 can be a wireline or other suitable line for supporting a tool 110 positionable downwell. The tool 110 can be any tool suitable for use downhole, including tools designed specifically for sensing conditions in a downhole environment. An optical cable 108 can be attached to, run alongside, or included within the support line 106. The optical cable 108 can include one or more optical fibers. The optical cable 108 couples the optical modulator 112 of the downhole tool 110 to a transceiver 130 at the surface. The support line 106 can additionally supply the tool 110 with power, fluid, or other connection with the surface.

The optical modulator 112 of the downhole tool 110 receives a data signal from one or more sensors of the downhole tool 110. The optical modulator 112 also receives a carrier signal from the transceiver 130. The optical modulator 112 modulates the carrier signal based on the data signal to generate a modulated signal, which is directed back to the surface, such as via the optical cable 108. The optical modulator 112 and any sensors and processing equipment coupled thereto can be powered by a power connection with the surface, such as through the support line 106. In some embodiments, the optical modulator 112 is able to obtain electrical power from the carrier signal, such as by splitting the carrier signal in the downhole tool 110 and providing part of the carrier signal to a photovoltaic device, which can be used to power the optical modulator 112 and other electronics of the downhole tool. In some embodiments, the optical modulator 112 is able to operate without the need for a power connection with the surface.

The transceiver 130 is capable of generating the carrier signal and transmitting the carrier signal down the optical cable 108. The transceiver 130 further is capable of receiving the modulated signal from the optical cable 108. The transceiver 130 can be coupled to a processor 132 and memory 134 to enable functionality of the transceiver 130. In some embodiments, a separate transmitter (e.g., carrier signal generator) and receiver are used, rather than a single transceiver 130. The memory 134 can store information about the carrier signal (e.g., amplitude and frequency). Upon receiving the modulated signal, the modulated signal can be compared to the information stored in the memory 134 in order to demodulate the modulated signal and reproduce the data signal.

Figure 2:
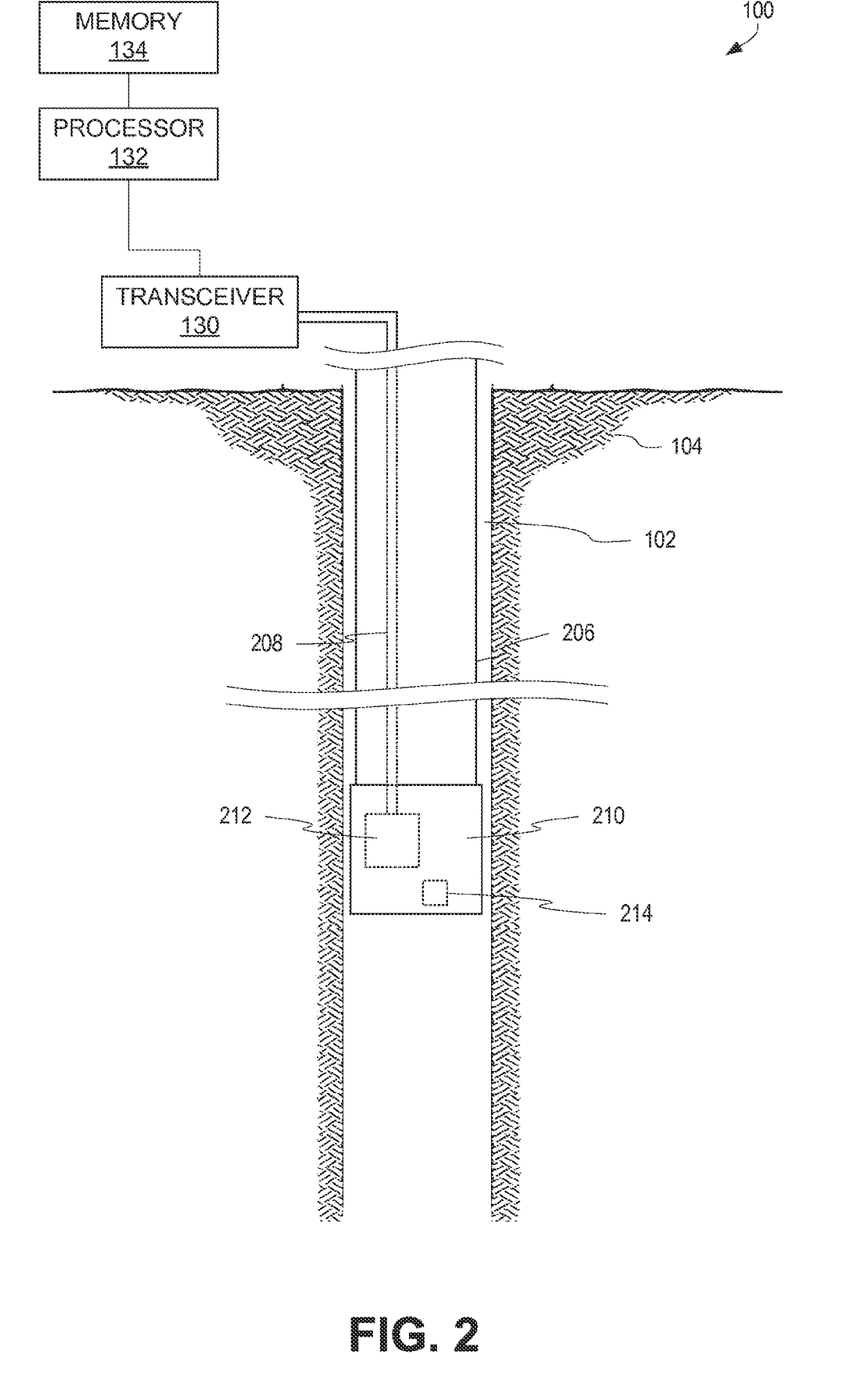
FIG. 2 is a schematic diagram of the wellbore servicing system of FIG. 1 as used with a tool supported by a workstring, according to certain aspects of the present disclosure.

FIG. 2 is a schematic diagram of the wellbore servicing system 100 of FIG. 1 as used with a tool 210 supported by a workstring 206, according to certain aspects of the present disclosure. The tool 210 can be located on any suitable tubing string, such as a workstring 206. A service rig, such as a drilling rig, a completion rig, a workover rig, or other mast structure or combination thereof can support a workstring 206 in the wellbore 102, but in other examples a different structure can support the workstring 206. For example, an injector head of a coiled tubing rigup can support the workstring 206.

The tool 210 can include an optical modulator 212 similar to the optical modulator 112 of FIG. 1. The optical modulator 212 can be coupled to the transceiver 130 through an optical cable 208 and is capable of modulating a carrier signal into a modulated signal based on a data signal from one or more sensors. The optical cable 208 can be attached to, run alongside, or included within the workstring 206. The transceiver 130, processor 132, and memory 134 all function as described with reference to FIG. 1 and elsewhere herein.

In some embodiments, a tool, such as tool 210, can be locally powered or self-powered. The tool 210 can include a battery 214, which may or may not be used to power operation of the tool. While the term "battery" is used herein, any suitable form of local power can be used, such as a charge holding device (e.g., capacitor) or a power generating device (e.g., piezoelectric generator). The local power from the battery 214 can be used to power the optical modulator 212 and any sensors and processing equipment coupled thereto.

Figure 3:
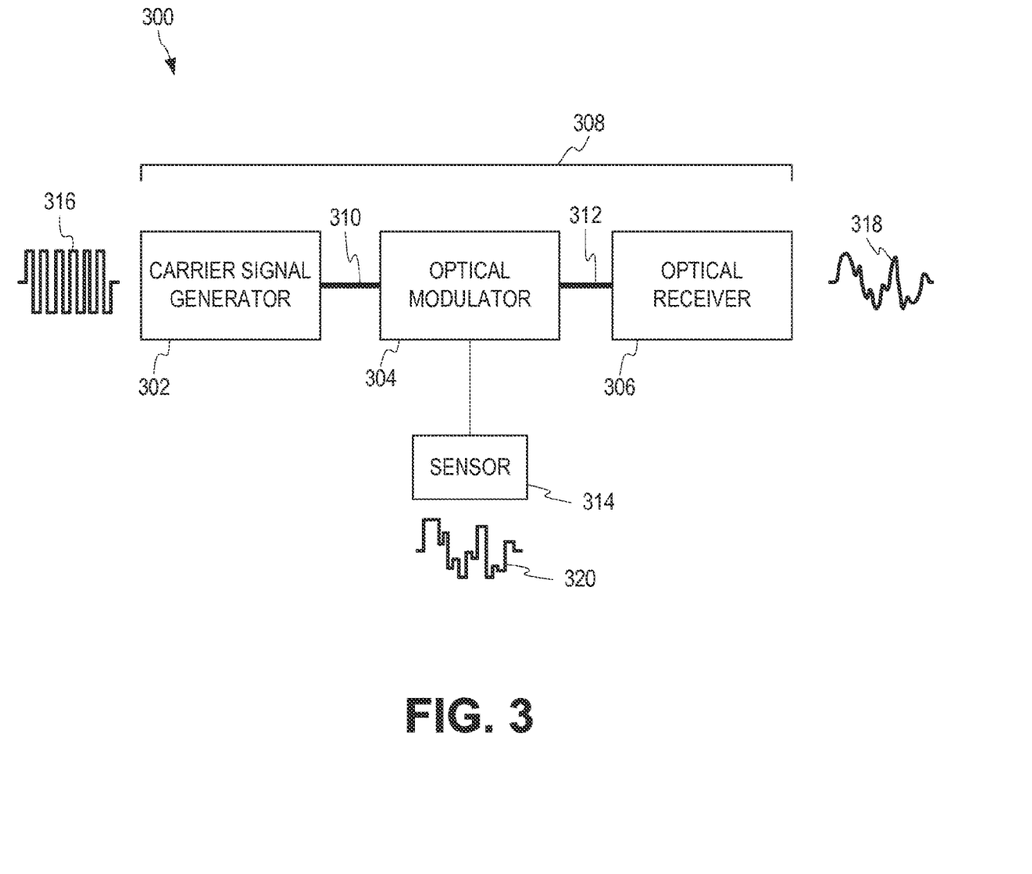
FIG. 3 is a schematic depiction of a downhole communication system according to certain aspects of the present disclosure.

FIG. 3 is a schematic depiction of a downhole communication system 300 according to certain aspects of the present disclosure. The downhole communication system 300 includes an optical path 308 formed between a carrier signal generator 302, an optical modulator 304, and an optical receiver 306. In an embodiment, the carrier signal generator 302 is coupled to the optical modulator 304 by a first optical fiber 310 and the optical modulator 304 is coupled to the optical receiver 306 by a second optical fiber 312. In alternate embodiments, the optical modulator 304 is coupled to both the carrier signal generator 302 and the optical receiver 306 by the same optical fiber.

The carrier signal generator 302 generates a carrier signal 316. The carrier signal generator 302 can include a laser that generates optical energy of a certain wavelength and amplitude, which is directed through the optical path 308 towards the optical modulator 304.

Upon reaching the optical modulator 304, the carrier signal 316 is modulated into a modulated signal 318, which is directed through the optical path 308 towards the optical receiver 306. The optical modulator 304 modulates the carrier signal 316 based on a data signal 320 received from a sensor 314. The optical modulator 304 can be any suitable device for detectably changing an attribute of the carrier signal 316. The optical modulator 304 can be a Mach-Zehnder device that induces phase modulation in response to physical movement. The optical modulator 304 can be a piezoelectric material that induces modulation in response to electrical signals. The optical modulator 304 can be an acousto-optic modulator, such as a Bragg cell. In some embodiments, the optical modulator 304 is an electro-optic modulator, such as a Pockels cell. The optical modulator 304 can be made of Lithium Niobate.

In some embodiments, the carrier signal 316 is directed through the optical modulator 304, which modulates the carrier signal 316 into the modulated signal 318. In some embodiments, the carrier signal 316 is directed onto the optical modulator 304, which reflects a modulated signal 318. In such embodiments, the optical modulator 304 can reflect a modulated signal 318 back into the same optical fiber from which the carrier signal 316 was provided, or into one or more other optical fibers.

The sensor 314 can be any suitable device for sensing a downhole condition, including environmental conditions (e.g., temperature and pressure), positioning conditions (e.g., distance within the wellbore or locatable coordinates), conditions of the tool itself (e.g., whether a tool is in working condition), or any other condition. Examples of suitable sensors include pressure sensors, temperature sensors, casing collar locator sensors (e.g., using a magnetic sensor), tension sensors, torque sensors, accelerometers, flow meters, density meters, and other sensors.

In some embodiments, the sensor 314 is coupled to a processor in order to convert the raw sensor data into a data signal 320. In some embodiments, the sensor 314 is coupled to an analog to digital converter in order to convert the raw sensor data into a data signal 320. In some embodiments, the sensor's 314 raw sensor data is the data signal 320 that is provided to the optical modulator 304. In some embodiments, the sensor's 314 raw sensor data is provided to the optical modulator 304 as a non-electric data signal (e.g., a mechanical vibration or physical movement). For example, an optical modulator 304 that is based on a Mach-Zehnder device can modulate an optical signal based on physical movement, and a sensor 314 can be a mechanical probe on the side of a tool that is biased outwards, such that it moves inwards in response to impinging on protrusions in the wellbore (e.g., shaped features of the surrounding casing or a surrounding tubular). In that example, the movement of the sensor 314 is the data signal that is transmitted to the optical modulator 304 by mechanical linkages, causing the Mach-Zehnder device to modulate the carrier signal into a modulated signal based on the movement of the sensor 314 (e.g., the data signal 320). Once demodulated, the data signal 320 can be analyzed to determine when the tool has passed the protrusions in the wellbore or the shaped features of the surrounding casing or surrounding tubular.

The optical receiver 306 can be any suitable device for converting the optical modulated signal 318 into an electrical signal that can be demodulated in order to reproduce the data signal 320. The data signal 320 can be stored (e.g., in a memory), displayed (e.g., presented to a user by a user interface), used as a rule (e.g., compared with a threshold signal in order to produce an alarm condition), or otherwise used.

Figure 4:
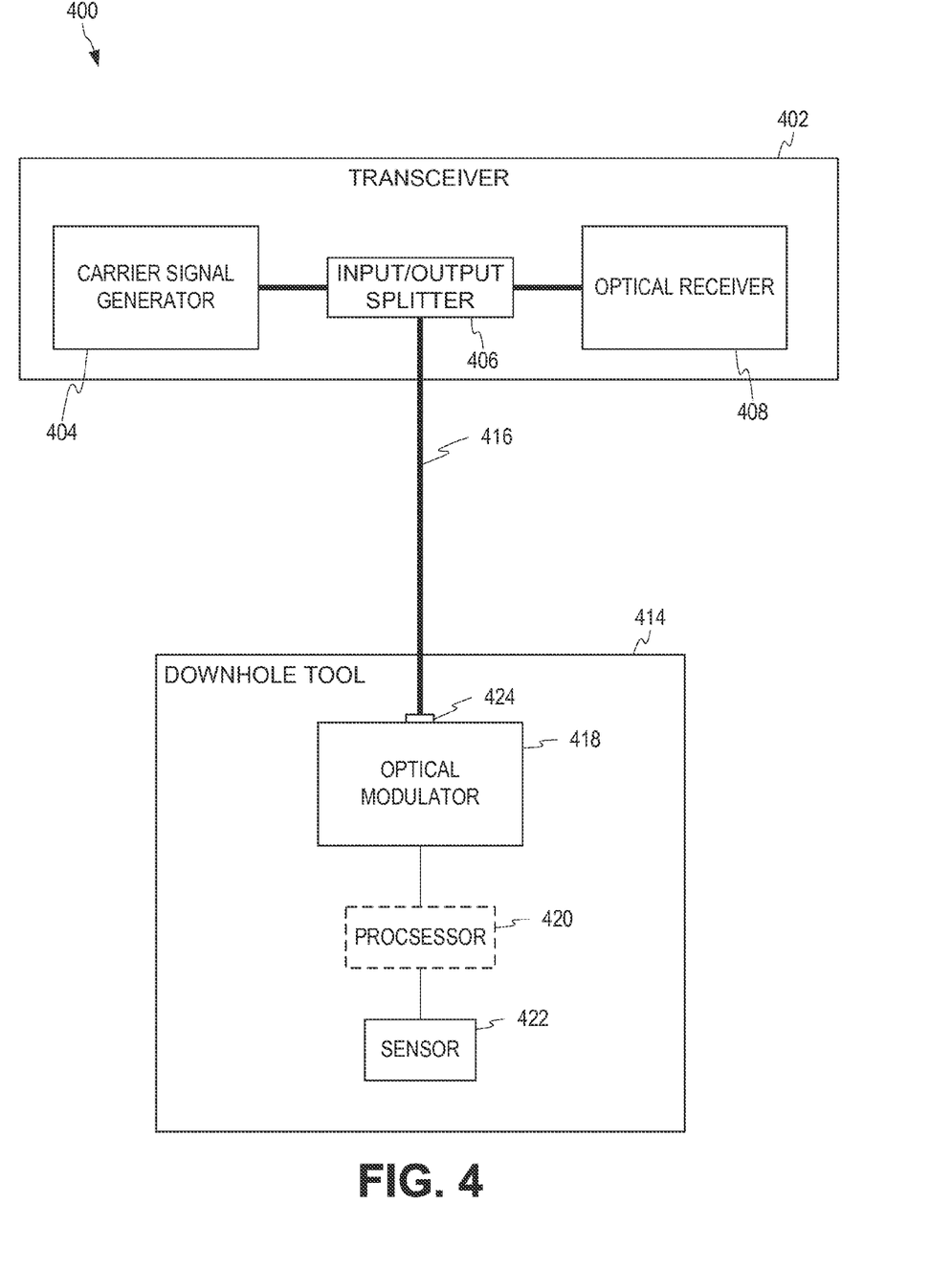
FIG. 4 is a schematic depiction of a downhole communication system having a single transceiver according to certain aspects of the present disclosure.

FIG. 4 is a schematic depiction of a downhole communication system 400 having a single transceiver 402 according to certain aspects of the present disclosure. The downhole communication system 400 depicts a transceiver 402 coupled to an optical modulator 418 of a downhole tool 414 by an optical fiber 416. In some embodiments, the optical fiber 416 includes additional redundant optical fibers all transmitting the same signals.

The transceiver 402 can include a carrier signal generator 404, similar to the carrier signal generator 302 of FIG. 3. The carrier signal generator 404 can generate a carrier signal that is transmitted down the optical fiber 416, optionally through an input/output splitter 406. A modulated signal can pass up the optical fiber 416, optionally through an input/output splitter 406, and to the optical receiver 408. The carrier signal generator 404 can provide a pulsed carrier signal, allowing the optical receiver 408 to receive the modulated signal whenever the carrier signal generator 404 is not transmitting a carrier signal.

The optical fiber 416 can be coupled to the optical modulator 418 by a coupling 424. A sensor 422 can be coupled to the optical modulator 418, optionally through a processor 420, in order to provide data signals to the optical modulator 418.

In some embodiments, a plurality of sensors can be coupled to the processor 420, which can multiplex a plurality of raw sensor data into a single data signal. In such embodiments, the modulated signal received by the optical receiver 408 can be demodulated and then demultiplexed in order to recreate the raw sensor data from the plurality of sensors.

Figure 5:
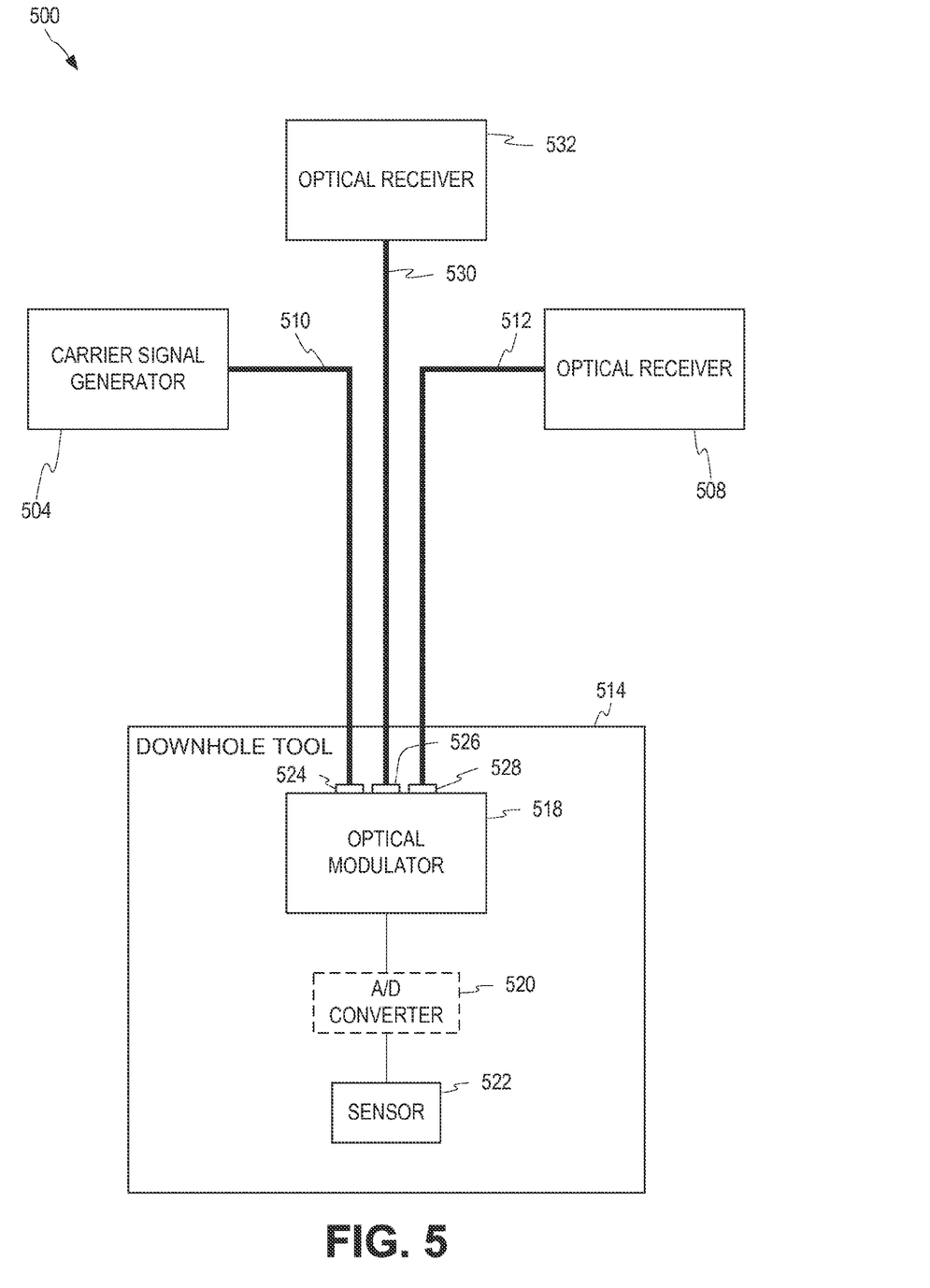
FIG. 5 is a schematic depiction of a downhole communication system having multiple optical receivers according to certain aspects of the present disclosure.

FIG. 5 is a schematic depiction of a downhole communication system 500 having multiple optical receivers 532, 508 according to certain aspects of the present disclosure. A carrier signal generator 504 can provide a carrier signal to an optical modulator 518 through a first optical fiber 510 coupled to the optical modulator 518 by a first coupling 524. The optical modulator 518 can modulate the carrier signal based on a data signal from a sensor 522. The sensor 522 can be coupled to the optical modulator 518, optionally through an analog-to-digital converter 520.

The optical modulator 518 can provide modulated signal out of one or more couplings that are separate from the first coupling 524. The optical modulator 518 can provide a modulated signal through a second coupling 526 and up a second optical fiber 530 to a first optical receiver 532. The optical modulator 518 can also provide the modulated signal through a third coupling 528 and up a third optical fiber 512 to a second optical receiver 508. Any number of couplings and optical receivers can be used.

Figure 6:
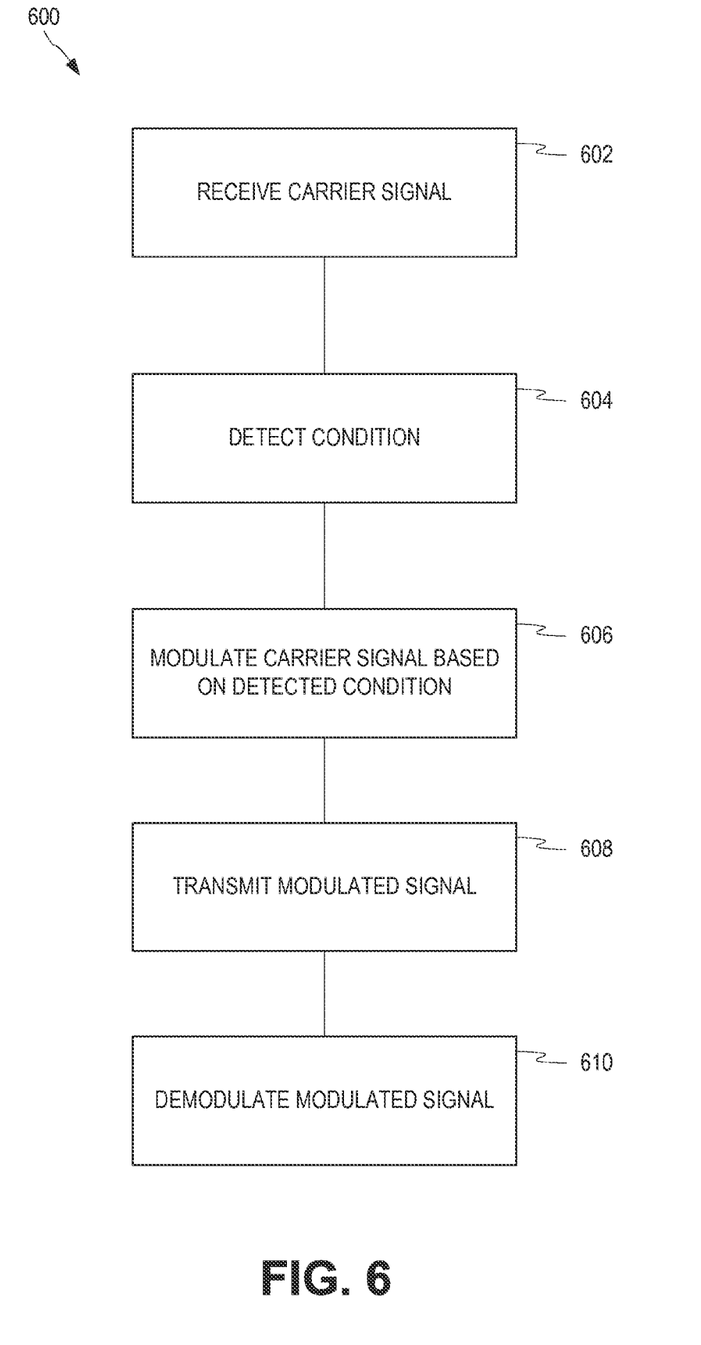
FIG. 6 is a flowchart depicting a method of downhole communication according to certain aspects of the present disclosure.

FIG. 6 is a flowchart depicting a method of downhole communication 600 according to certain aspects of the present disclosure. At block 602, a carrier signal is received by an optical modulator of a downhole tool. At block 604, a condition is detected by a sensor of the downhole tool. At block 606, the optical modulator modulates the carrier signal based on the detected condition (e.g., using a data signal provided from the sensor). At block 608, the optical modulator transmits the modulated signal to an optical receiver. At block 610, the modulated signal is demodulated in order to determine the detected condition (e.g., by reproducing and interpreting the data signal).

Various aspects of the present disclosure have been described herein using one or more optical fibers to transmit signals to and from an optical modulator. It will be understood that any suitable combination of the above aspects can be used to receive data from a downhole tool. In some alternate embodiments, a carrier signal generator, an optical receiver, or both, can be located at a location between the surface and the wellbore, such as in a tool positioned in the wellbore, but nearer the surface than the tool having the optical modulator.

In some embodiments, the downhole tool having an optical modulator can withstand harsher downhole environments than a downhole tool having a light source for optical communication. In some embodiments, the downhole tool having an optical modulator can withstand temperatures in excess of 175° C. In some embodiments, the downhole tool having an optical modulator can withstand temperatures in excess of 200° C. In some embodiments, the downhole tool having an optical modulator can withstand temperatures in excess of 200° C. for at least a duration of 7 days.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a downhole sensing system comprising a carrier signal generator positionable external to a wellbore for providing a carrier signal; and a downhole tool positionable in the wellbore, the downhole tool including a sensor for providing a data signal; and an optical modulator coupled to the sensor for receiving the data signal, the optical modulator coupled in an optical path between the carrier signal generator and an optical receiver for modulating the carrier signal from the carrier signal generator based on the data signal.

Example 2 is the system of example 1, wherein the optical modulator includes a coupling for optically coupling the optical modulator to the carrier signal generator and the optical receiver through an optical fiber.

Example 3 is the system of examples 1 or 2, wherein the optical modulator includes a first coupling for optically coupling the optical modulator to the carrier signal generator through a first optical fiber, and a second coupling for optically coupling the optical modulator to the optical receiver through a second optical fiber.

Example 4 is the system of example 3, wherein the optical modulator includes a third coupling for optically coupling the optical modulator to a third optical receiver through a third optical fiber.

Example 5 is the system of examples 1-4, wherein the sensor is a non-electrical sensor for providing a non-electrical data signal, and wherein the optical modulator is coupled to the sensor for modulating the carrier signal based on the non-electrical data signal.

Example 6 is the system of examples 1-5, wherein the optical modulator is a piezoelectric material.

Example 7 is the system of examples 1-6, wherein the downhole tool is battery-powered.

Example 8 is a method comprising generating a carrier signal by a carrier signal generator positionable external a wellbore; receiving the carrier signal through an optical fiber by an optical modulator positionable in the wellbore; receiving a data signal from a sensor; modulating the carrier signal based on the data signal to generate a modulated signal; transmitting the modulated signal through the optical fiber or one or more additional optical fibers, where the modulated signal is demodulatable to determine the data signal when received by an optical receiver.

Example 9 is the method of example 8, wherein receiving the data signal from the sensor includes processing a sensor signal to generate the data signal.

Example 10 is the method of examples 8 or 9, wherein receiving the data signal from the sensor includes receiving a non-electrical data signal.

Example 11 is the method of examples 8-10, wherein modulating the carrier signal includes modulating a phase, an amplitude, or a polarity of the carrier signal based on the data signal.

Example 12 is the method of examples 8-11, wherein the optical modulator is included in a downhole tool positionable in the wellbore.

Example 13 is the method of example 12, wherein the optical modulator is powered by a battery of the downhole tool.

Example 14 is a system comprising a carrier signal generator positionable external a wellbore and coupled to a first end of an optical path for generating a carrier signal in the optical path, wherein the optical path includes at least one optical fiber; an optical receiver coupled to a second end of the optical path; and an optical modulator positionable in the wellbore, the optical modulator optically coupled between the carrier signal generator and the optical receiver for modulating the carrier signal based on a data signal.

Example 15 is the system of example 14, wherein the optical path includes a first optical fiber coupling the carrier signal generator and the optical modulator and a second optical fiber coupling the optical modulator and the optical receiver.

Example 16 is the system of example 15, wherein the optical path includes at least one additional optical fiber coupling the optical modulator to at least one additional optical receiver.

Example 17 is the system of examples 14-16, further comprising a processor coupled to a sensor, wherein the processor is coupled to the optical modulator for providing the data signal.

Example 18 is the system of examples 14-17, wherein the optical modulator is incorporated with a downhole tool for transmitting data while the downhole tool is in a downhole environment.

Example 19 is the system of example 18, wherein the downhole tool is battery-powered.

Example 20 is the system of examples 14-19, wherein the optical modulator is a piezoelectric material.

What is claimed is:

1. A downhole sensing system, comprising:
    a carrier signal generator positionable external to a wellbore for providing a carrier signal; and
    a downhole tool positionable in the wellbore, the downhole tool including:
        a sensor for providing a data signal; and
        an optical modulator coupled to the sensor for receiving the data signal, the optical modulator coupled in an optical path between the carrier signal generator and an optical receiver for modulating the carrier signal from the carrier signal generator based on the data signal,
        wherein the optical modulator includes a first coupling for optically coupling the optical modulator to the carrier signal generator through a first optical fiber, a second coupling for optically coupling the optical modulator to the optical receiver through a second optical fiber, and a third coupling for optically coupling the optical modulator to a second optical receiver through a third optical fiber.

2. The system of claim 1, wherein the sensor is a non-electrical sensor for providing a non-electrical data signal, and wherein the optical modulator is coupled to the sensor for modulating the carrier signal based on the non-electrical data signal.

3. The system of claim 1, wherein the optical modulator is a piezoelectric material.

4. The system of claim 1, wherein the downhole tool is battery-powered.

5. The downhole sensing system of claim 1, further comprising a photovoltaic device to provide power to the optical modulator.

6. The downhole sensing system of claim 1, wherein the optical modulator comprises a Mach-Zehnder device.

7. A method, comprising:
    generating a carrier signal by a carrier signal generator positionable external a wellbore;
    receiving the carrier signal through a first optical fiber by an optical modulator positionable in the wellbore;
    receiving a data signal from a sensor;
    modulating the carrier signal based on the data signal to generate a modulated signal; and
    transmitting the modulated signal through first and second optical fibers, where the modulated signal is demodulatable to determine the data signal when received by an optical receiver.

8. The method of claim 7, wherein receiving the data signal from the sensor includes processing a sensor signal to generate the data signal.

9. The method of claim 7, wherein receiving the data signal from the sensor includes receiving a non-electrical data signal.

10. The method of claim 7, wherein modulating the carrier signal includes modulating a phase, an amplitude, or a polarity of the carrier signal based on the data signal.

11. The method of claim 7, wherein the optical modulator is included in a downhole tool positionable in the wellbore.

12. The method of claim 11, wherein the optical modulator is powered by a battery of the downhole tool.

13. The method of claim 7, further comprising splitting the carrier signal to provide power to the optical modulator.

14. A system, comprising:
    a carrier signal generator positionable external a wellbore and coupled to a first end of an optical path for generating a carrier signal in the optical path, wherein the optical path includes at least one optical fiber;
    at least two optical receivers coupled to a second end of the optical path; and
    an optical modulator positionable in the wellbore, the optical modulator optically coupled between the carrier signal generator and the at least two optical receivers for modulating the carrier signal based on a data signal.

15. The system of claim 14, wherein the optical path includes a first optical fiber coupling the carrier signal generator and the optical modulator, a second optical fiber coupling the optical modulator and a first optical receiver of the at least two optical receivers, and a third optical fiber coupling the optical modulator to a second optical receiver of the at least two optical receivers.

16. The system of claim 14, further comprising a processor coupled to a sensor, wherein the processor is coupled to the optical modulator for providing the data signal.

17. The system of claim 14, wherein the optical modulator is incorporated with a downhole tool for transmitting data while the downhole tool is in a downhole environment.

18. The system of claim 17, wherein the downhole tool is battery-powered.

19. The system of claim 14, wherein the optical modulator is a piezoelectric material.

20. The system of claim 14, further comprising a photovoltaic device to provide power to the optical modulator.

* * * * *